United States Patent [19]
Kirino et al.

[11] Patent Number: 5,590,111
[45] Date of Patent: Dec. 31, 1996

[54] METHOD OF CONTROLLING RECORDING OF OPTICAL RECORDS

[75] Inventors: Fumiyoshi Kirino, Tokyo; Takeshi Maeda, Kokubunji; Hiroshi Ide, Kodaira; Toshimitsu Kaku, Sagamihara; Seiichi Mita, Kanagawa-ken; Kazuo Shigematsu, Saitama-ken; Tsuyoshi Toda, Kodaira, all of Japan

[73] Assignee: Hitachi, Ltd., Tokyo, Japan

[21] Appl. No.: 91,003

[22] Filed: Jul. 13, 1993

Related U.S. Application Data

[63] Continuation-in-part of Ser. No. 720,706, Jun. 25, 1991, and Ser. No. 764,922, filed as PCT/JP92/01460 Nov. 10, 1992, which is a continuation-in-part of Ser. No. 720,706, Jun. 25, 1991.

[30] Foreign Application Priority Data

| Jun. 29, 1990 | [JP] | Japan | 2-170052 |
| Sep. 28, 1990 | [JP] | Japan | 2-256904 |
| Nov. 11, 1991 | [JP] | Japan | 3-294145 |
| Feb. 13, 1992 | [JP] | Japan | 4-026508 |
| Feb. 13, 1992 | [JP] | Japan | 4-026509 |
| Feb. 13, 1992 | [JP] | Japan | 4-026511 |
| Apr. 21, 1992 | [JP] | Japan | 4-100897 |
| Jul. 14, 1992 | [JP] | Japan | 4-186586 |
| Sep. 4, 1992 | [JP] | Japan | 4-236969 |

[51] Int. Cl.$^6$ ............ G11B 7/00; G11B 3/90; G11B 5/09; G11B 20/10
[52] U.S. Cl. ............ 369/116; 369/54
[58] Field of Search ............ 369/116, 124, 369/121, 13, 100, 110, 54; 360/114; 358/342

[56] References Cited

U.S. PATENT DOCUMENTS

| 4,979,162 | 12/1990 | Kimoto et al. | 369/116 |
| 5,305,296 | 4/1994 | Kono | 369/116 |
| 5,305,297 | 4/1994 | Nishiuchi et al. | 369/116 |
| 5,329,512 | 7/1994 | Fukimoto et al. | 369/116 |
| 5,381,396 | 1/1995 | Tanaka et al. | 369/116 |
| 5,398,227 | 3/1995 | Miyaoka et al. | 369/116 |
| 5,410,527 | 4/1995 | Ashinuma | 369/116 |

FOREIGN PATENT DOCUMENTS

| 61-239441 | 10/1986 | Japan | G11B 11/10 |
| 322223 | 1/1991 | Japan | G11B 7/00 |

*Primary Examiner*—Thai Q. Tran
*Attorney, Agent, or Firm*—Antonelli, Terry, Stout & Kraus

[57] ABSTRACT

In a write control method on an optical recording, at least one shift amount selected from the defocus amount of a laser beam on a recording medium, the shift amount of a recording position on a recording track and the shift amount of laser power during recording is controlled such that the selected amount falls within a predetermined range. Subsequently, a trial signal is trially recorded at a plurality of trial zones on the recording medium by using a laser power value as a parameter. The recorded trial signal is read and a difference $\Delta V$ between center levels of a highest density waveform and a lowest density waveform is detected. In connection with each trial zone, the laser power value when a reading trial signal which makes the difference $\Delta V$ minimum is recorded is defined as an optimum recording power value. Regular data is recorded at a predetermined storage area on the recording medium by using an optimum laser power value determined in connection with a trial zone closest to the predetermined storage area.

10 Claims, 15 Drawing Sheets

FIG. 9
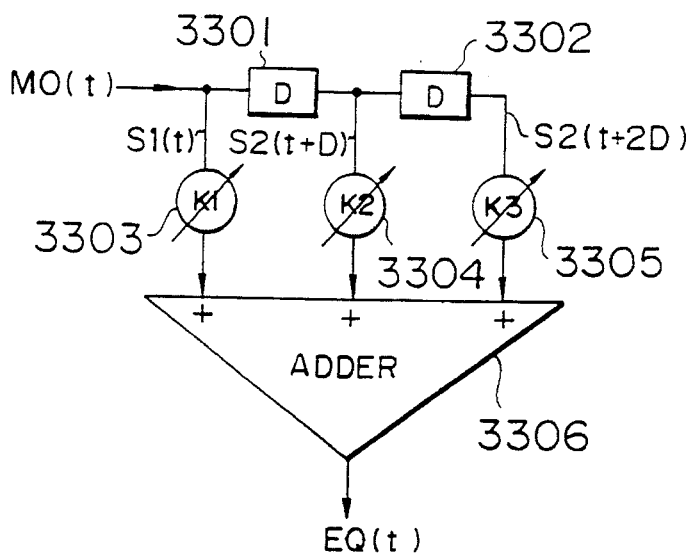
FIG. 10
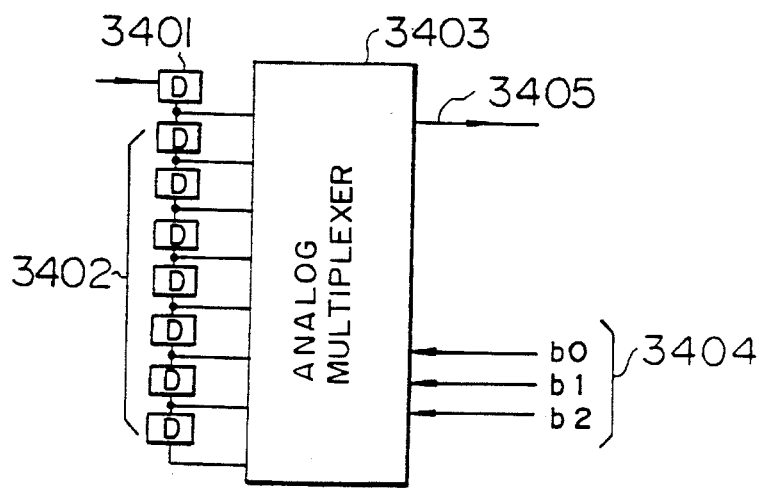
FIG. 11
| DELAY TIME SETTING SIGNAL | | | DELAY TIME (ns) |
|---|---|---|---|
| b0 | b1 | b2 | |
| 0 | 0 | 0 | 42.5 |
| 0 | 0 | 1 | 47.5 |
| 0 | 1 | 0 | 52.5 |
| 0 | 1 | 1 | 57.5 |
| 1 | 0 | 0 | 62.5 |
| 1 | 0 | 1 | 67.5 |
| 1 | 1 | 0 | 72.5 |
| 1 | 1 | 1 | 77.5 |

METHOD OF CONTROLLING RECORDING OF OPTICAL RECORDS

CROSS-REFERENCE TO RELATED APPLICATIONS

The present application is a continuation-in-part of U.S. patent application Ser. No. 07/720,706 filed on Jun. 25, 1991, U.S. patent application Ser. No. 07/764,922 filed on Sep. 24, 1991 which is a continuation-in-part of the U.S. patent application Ser. No. 07/720,706, filed on Jun. 25, 1991 and U.S. patent application based on Patent Cooperation Treaty Application No. PCT/JP92/01460 which is filed on Nov. 10, 1992 the contents of which are incorporated herein by reference.

BACKGROUND OF THE INVENTION

The present invention relates to a method of controlling recording, reproduction and erase of optical records by using a laser beam, and more particularly, to an optical record recording control method suitable to effect high-density recording by performing thermal recording through the use of a laser.

Recently, with an advance in a high information oriented society, needs for a file memory of large capacity and high density have been increased and an optical recording system has been highlighted as a system which meets such needs. The optical recording system is classified into three types, that is, a reproduction dedicated type, a write-once type and a rewrite type, and each type is used in particular applications which make the most of its features. Nowadays, a file memory of computers based on a rewrite type optical disc and a document file of computers based on an optomagnetic system have been practiced and of them, the rewrite type for which the needs are high has been desired to be further increased in density.

At present, techniques of achieving high-density recording are available including narrowing the track pitch physically, increasing the line density of recording and using a laser beam of a short wavelength, and as recording system, a pit edge recording system has been known. High-density recording can be realized by using these techniques in combination. Especially when information is held at an edge portion of a recorded domain, highly accurate determination of an edge position is of significance and it is important for realization of high density to determine this position accurately. In addition, stable formation of a small magnetic domain is important for practicing high-density recording.

In the optomagnetic recording system, the shape of a magnetic domain is considered to change readily under the influence of the ambient temperature. This leads to a significant fault especially when edge recording is performed. To solve this problem, a system has been proposed wherein a predetermined test pattern is recorded on a disc and it is reproduced to obtain control information. In connection with this proposal, one may refer to a technique disclosed in, for example, JP-A-61-239441.

JP-A-3-22223 discloses an optical recording and reproduction method according to a conventional technique, in which a recording code string of a recording mark is pulsed to form a pulse train corresponding to a length of the recording code string, the length and amplitude of the pulse train are controlled in accordance with the inverted phase length of a recording code string immediately preceding that recording code string to divide the pulse train into three parts, and recording is effected by changing the pulse width of each pulse.

SUMMARY OF THE INVENTION

An object of the present invention is to provide a method of controlling optical records which can guard high density and high accuracy of storage against variations in the use ambient, defocus of a laser beam, track offset and laser power.

In the aforementioned prior arts, the shape of a magnetic domain (the length and width of a magnetic domain) to be formed was varied with various kinds of factors and an increase in edge shift and jitter was not always taken care of sufficiently. More particularly, a predetermined test pattern was recorded in advance, the pattern was read and control information was obtained from a result of reading. In this case, when variations in defocus of a laser beam and the track offset during recording and reading of a test pattern as well as in laser power during recording sometimes exceeded predetermined amounts, it was impossible to obtain correct control information. Accordingly, when recording was effected with the above-described pit edge recording system, the edge shift and jitter increased because of erroneous control and there resulted a problem that stable recording and reading could not be achieved.

Achievement of the present invention is backgrounded by the foregoing and the present invention intends to solve the problems described as above in connection with the prior arts, and when employing a recording control system in which recoding is effected in advance by using a predetermined test pattern and control information during recording is obtained from a result of reproduction of the record, the present invention intends to provide a recording control method on the optical recording, which can ensure highly accurate control of the recording control system.

To accomplish the above object, according to the present invention, in a recording control method on the optical recording in which a predetermined test pattern is recorded on a recording medium, various kinds of variations in the use ambient are detected from a signal obtained by reproducing recorded data to produce control information to be used during recording of information and when recording of data on a recording medium or reading of recorded data is performed using the control information, the pulse width or laser power during the data recording is changed, recording and reading of the test pattern are effected by controlling at least one edge shift amount selected from the defocus amount of a laser beam on the recording medium during the test pattern recording, the shift amount of a recording position on a track at which recording is done on the recording medium and the shift amount of laser power irradiated during recording such that the selected amount falls within a predetermined range, to thereby obtain the control information.

Contrived for realization of high-density recording on an optical disc are physical techniques such as narrowing of the track pitch, formation of a small magnetic domain and employment of an MCAV (or zoned CAV) system, a technique in view of a system such as a pit edge recording system and a technique in view of an apparatus such as use of light of a short wavelength to perform recording and reading. Efficiently, these techniques are used in combination.

Incidentally, in performing pit edge recording, highly accurate determination of an edge position of a pit is important. The edge position is known as varying in dependence on the irregularity among discs, variations in the use ambient temperature of apparatus, the shape of light, the laser power, data pattern of recording and the lens aberration as well as the operational displacement of the driving unit. Especially, of these factors, a variation of the focus system for focusing the laser beam totally affects the aforementioned edge position shift. At present, autofocus is adopted in the focus system. However, if the focus is originally shifted (defocused) by a fixed value in the initial state, the defocus amount cannot be detected in the form of an error signal, raising a serious problem in practicing edge recording. In addition, when a variation in laser power or a variation in track position takes place, the variation likewise leads to an edge shift. Suppression of the variations was an important problem in practicing the pit edge recording.

To solve this problem, an efficient technique is such that a predetermined pattern is recorded at a predetermined position on a disc, the pattern is read and compared with reference data, and a difference from the criterion condition is detected to effect recording control. This technique is however disadvantageous in that when the defocus of a laser beam and the track offset during recording and reproduction of the test pattern and the laser power during recording vary to exceed predetermined amounts, correct control information cannot be obtained. In performing recording based on the pit edge recording, resulting erroneous control gives rise to an increased edge shift or an increased jitter, thus preventing stable recording and reading. Accordingly, in spite of the fact that the sufficient adjustment of the focus system during the disc drive preparation and the use of a highly accurate autofocus system are of importance, realization of these requirements was limited from the standpoint of production.

Therefore, if the offset of focus is suppressed to a constant value or less which leads to an allowable edge shift amount and the edge shift amount corresponding to the offset amount at that time is made to be known, the correction of the focus offset is easy to achieve. The influence of a variation in laser power due to contaminants on the objective lens of the optical head and to an error in setting of power can be eliminated by using a technique wherein a predetermined pattern is recorded trially and power is corrected in compliance with the ambient condition on the basis of a result of trial recording. Further, the shift of information positioning (track offset) can be taken care of for correction by not only suppressing this shift to below a constant value but also knowing that shift amount.

In the recording control method on the optical recording, according to the present invention, a predetermined test pattern is recorded on a disc before recording information, a signal indicative of the test pattern is read to detect a variation in the use ambient condition for the apparatus and when performing recording of data by using a result of the variation detection, the offset amount of focus during the test, the offset amount of tracking and the variation amount of power are controlled such that they fall within predetermined ranges, whereby the shape of a recording magnetic domain to be obtained can be controlled accurately to realize highly accurate pit edge recording. As a result, the line density can be improved and besides interference between pits can be suppressed.

Incidentally, in the following description, when are corded signal is demodulated by using a system for directly slicing an obtained reproduction signal (original signal), that is, a so-called original waveform slicing system, a method is used in which demodulation is carried out by slicing an obtained signal amplitude at a center value. But the effect of the present invention does not depend on the signal detection system and the present invention provides a method for obtaining the shape of a stable magnetic domain. Here, how much the track offset amount and the defocus amount during test recording or the variation amount of recording power should be suppressed is rather determined in dependence on how much the edge shift amount should be suppressed. For example, such approaches are conceivable as improving accuracies of working of optical parts and mechanical system parts used, using electronic parts which exhibit stable characteristics against the use ambient temperatures, improving accuracies of adjustments of the optics and the mechanical system and studying a novel system for detection of the signal based on a magneto-optical recording. Through this, various kinds of shifts can be made to be substantially constant and the control accuracy can be promoted.

As described in detail, the present invention can provide the technique which is effective to determine the edge position essential to the pit edge recording effective for high-density recording. More specifically, when recording is effected in advance by using a predetermined test pattern and the pattern is read to detect a variation in the use ambient of the apparatus to thereby control the shape of a magnetic domain to be formed, the defocus amount during recording of the test pattern and during reproduction of the recorded pattern and the variation of laser power are suppressed so as to fall within predetermined ranges, whereby even when the optical disc drive is used in any ambients, magnetic domains to be formed can always have the same shape of the domain edge.

The present invention is suitable for pit edge recording and consequently it can improve the line recording density to realize highly reliable, high-density magneto-optical recording. The kind of the optical disc used in the present invention is not limitative as far as the optical disc is based on the thermal recording.

The present invention also contemplates maximal suppression of a variation of a recording mark due to a recording sensitivity variation so as to ensure accurate recording mark control.

Further, in the present invention, compatibility of the recording and reading apparatus with the recording medium is improved and a recording sensitivity variation and a recording power variation due to the recording and reproduction apparatus are also suppressed.

Further, in the present invention, the reliability of the recording and reproduction apparatus, the memory capacity and the transfer rate of information are improved.

Thus, for the purpose of improving the compatibility of the recording medium with the apparatus for performing recording, trial write is effected at a predetermined position on the recording medium, optimum recording power is found from a reproduction signal produced through the trail write, and thereafter recording of regular information is started.

Trial write data and an input data bit string indicative of regular information are converted into code strings complying with the modulation system of the apparatus for recording, data strings for recording the code strings on the recording medium are generated and a recording area is formed on the recording medium by driving a laser light source to perform accurate recording.

To accomplish the above, trial write data and a recording pulse train and a recording auxiliary pulse which correspond to a recording mark of an input data bit string indicative of regular information are generated, and recording on the recording medium is carried out by using two light intensity values or two energy levels of the recording pulse train and the recording auxiliary pulse.

To accomplish the above, in a recording medium which can permit overwrite of information, light intensity of the recording pulse train and the recording auxiliary pulse is modulated so as to be applied to recording power and erase power.

Also, when trail write is effected in advance at a predetermined position on the recording medium and recording of regular information is started on the basis of optimum recording power obtained through the trial write, trial write data and an input data bit string indicative of regular information are converted into code strings of the apparatus for recording, a data string for recording the code strings on the recording medium is generated and a laser light source is driven to form a recording area on the recording medium, whereby light intensity or energy level of the recording pulse train and the recording auxiliary pulse corresponding to a recording mark is controlled.

In trial write operation, for the sake of improving the compatibility of the recording medium with the apparatus used for recording, a stringent recording mark to be recorded, which is used to detect a variation in thickness of a recording medium occurring upon exchange of the recording medium and a variation in sensitivity to recording on the recording medium due to a change of ambient temperature and a change of characteristics of the apparatus, is written at a predetermined position on the recording medium in advance of recording of regular information. Further, in order to find optimum recording power from a reproduction signal obtained from recorded trial write data, recording operation is executed by changing light intensity or energy of a recording waveform for the record. Through this, optimum recording conditions for the recording medium can always be obtained and therefore, erroneous recording operation of information concomitant with the previously-described recording sensitivity variation can be eliminated and reliable recording and reproduction can be ensured.

Further, in order to minimize trial write effected immediately after regular information recording or by recording and reproduction carried out at a certain period, a recording pulse train and a recording auxiliary pulse corresponding to a recording mark are generated, and two light intensity values or two energy levels of the recording pulse train and the recording auxiliary pulse are used to make temperature of the recording medium substantially constant to thereby perform recording controlled in the length and width of the recording mark.

According to the present invention, a variation in sensitivity to recording on the recording medium due to a variation in thickness of the recording medium or a variation in the ambient temperature as well as a variation in sensitivity to recording due to the recording and reproduction apparatus is suppressed to improve the compatibility of the recording and reading apparatus with the recording medium and to control the recording mark accurately and therefore, reliability of the recording and reproduction apparatus, the recording capacity and the transfer rate of information can be improved to advantage.

BRIEF DESCRIPTION OF THE DRAWINGS

FIG. 9 is a block diagram showing an example of a waveform equalizer.

FIG. 10 is a block diagram showing an example of a delay element which can make the delay time variable.

FIG. 11 is a table for explaining the relation between delay time setting signals and delay times.

DESCRIPTION OF THE PREFERRED EMBODIMENTS

Embodiments of the present invention will be described hereunder in greater detail with reference to the accompanying drawings.

Figure 2:
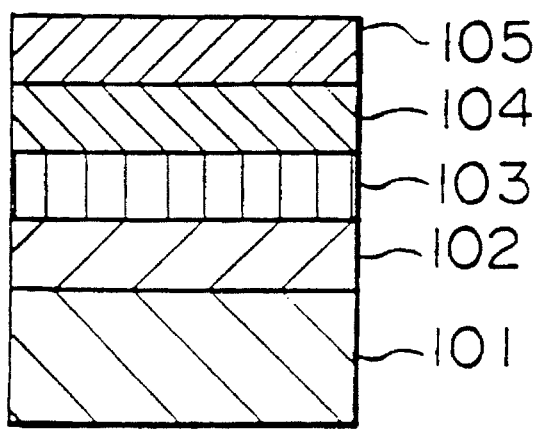
FIG. 2 is a diagram showing a structure of a disc according to an embodiment.

FIG. 2 is a diagrammatic representation showing an example of sectional structure of an optomagnetic disc used in an embodiment of the present invention. The present embodiment is an example using an optomagnetic recording medium. In the optomagnetic disc shown in FIG. 2, an optically transparent substrate 101 made of, for example, glass or plastics is made to be uneven in its surface to form guide grooves, a silicon nitride film 102 is formed on the substrate through sputtering process, and a TbFeCoNb film serving as a magneto-optical recording film 103 is formed on the film 102. Here, Nb is an element added to improve the corrosion resistance of the recording film but instead of this element, Ti, Ta or Cr may also be used to obtain similar effects. Subsequently, as a third film, a silicon nitride film 104 is again formed. Finally, as a metal film 105, an AlTi alloy film is formed. These layers of films are all formed by sequential lamination through sputtering process but the preparation method of the disc and the laminar structure thereof will have no influence upon the effects of the present invention.

The thus prepared magneto-optical disc was subjected to recording, reading and erase operations. Especially, recording was effected using a so-called pit edge recording method which provides an edge portion with information during recording. In that case, if a laser beam irradiated from an optical head to determine an edge position was not so adjusted as to focus on the position of the recording film, a recording magnetic domain could not be formed at a desired position and as a result, an edge shift occurred. Adjustment of the focal position was carried out automatically in the head. Accordingly, during disc drive preparation, the positioning accuracy of the focal position was increased through adjustment of the head, adjustment of a servo mechanism system and an electrical technique. As a result, a recording magnetic domain could be formed at a desired position and information could be recorded highly reliably.

Figure 1A:
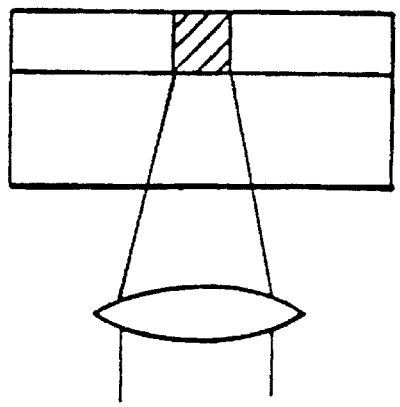
FIG. 1A is a diagram for explaining a laser beam and an edge position in a just focused state.
Figure 1B:
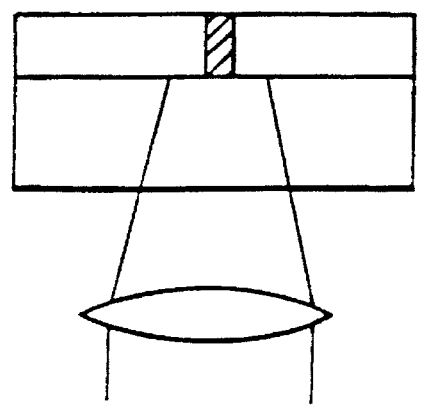
FIG. 1B is a diagram for explaining a variation in edge position due to defocus.

The influence of positioning of the focal position is diagrammatically shown in FIGS. 1A and 1B. Also, the relation between the defocus amount and the edge shift amount is illustrated in FIG. 3.

Figure 3:
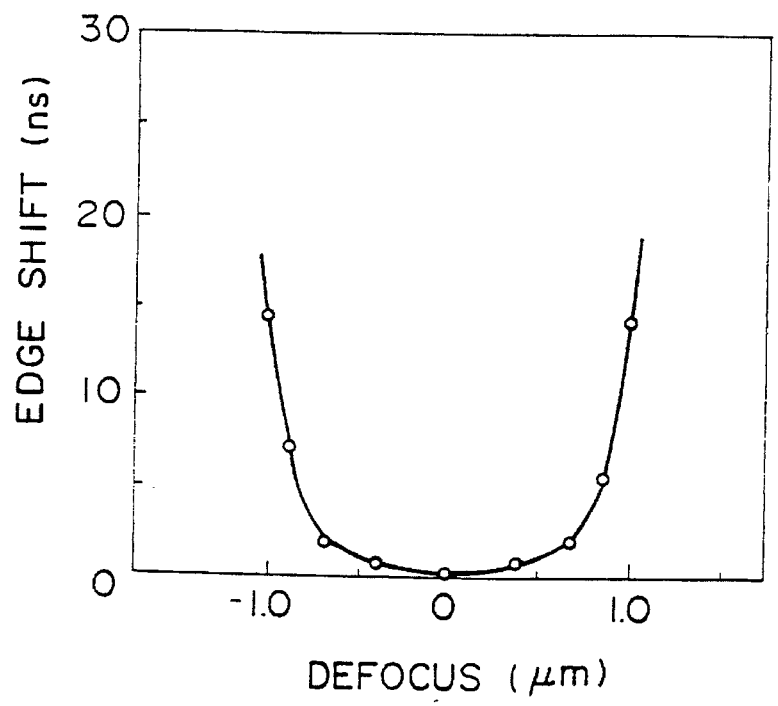
FIG. 3 is a graph showing the relation between the defocus amount and the edge shift amount.

As shown in FIG. 3, when the defocus amount was ±1 μm, the edge shift amount was ±14 ns but by adjusting the defocus amount to ±0.30 μm or less, the edge shift amount could be suppressed to ±2 ns or less. Consequently, reliability of data recording could be increased and high-density recording could be realized. Especially, when defocus occurs in a system wherein a signal for controlling recording conditions is obtained on the basis of a test record, there results an erroneous control signal, thereby making it impossible to perform highly accurate recording control.

Incidentally, variations in focusing does not depend on the structure of a magneto-optical disc but they take place in discs of any structure. Therefore, in order to decrease the defocus amount, it is efficient to improve the detection system, to effect highly accurate adjustment of a lens of the drive system, to simplify the optics, to improve accuracies of working of parts of the focusing system such as optical parts and to improve the control method.

Figure 4:
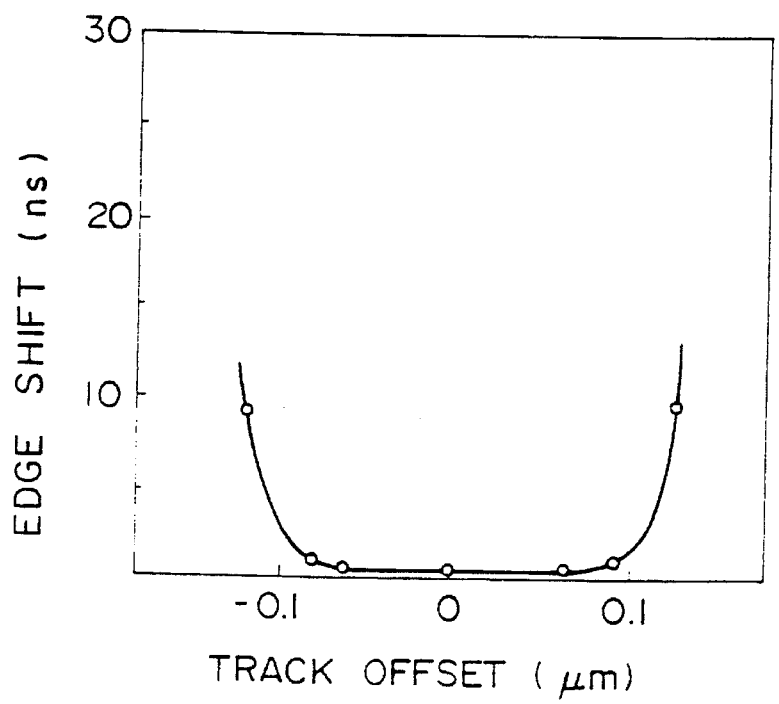
FIG. 4 is a graph showing the relation between the track offset amount and the edge shift amount.

In an embodiment to be described below, the edge shift amount is suppressed by controlling a track offset. A magneto-optical disc used has a similar structure to that of the first embodiment described previously. The relation between the track offset amount and the edge shift amount is illustrated in FIG. 4. Records were produced by changing the track offset amount and after that the records were reproduced under no offset condition to measure edge shift amounts. As a result, the edge shift was 9 ns when the offset was ±0.12 μm.

Contrary to this, the edge shift was small to take a value of 2 ns when the offset was small amounting to ±0.08 μm. Thus, by reducing the track offset, the edge shift could be reduced. The increase of the edge shift due to the presence of the track offset is affected by the accuracy of detection of an edge portion of a formed recording magnetic domain. Then, in order to reduce the track offset amount, such methods are efficient including developing a novel control system, improving accuracies of working of parts used and improving a system for detection of a control signal.

Figure 5:
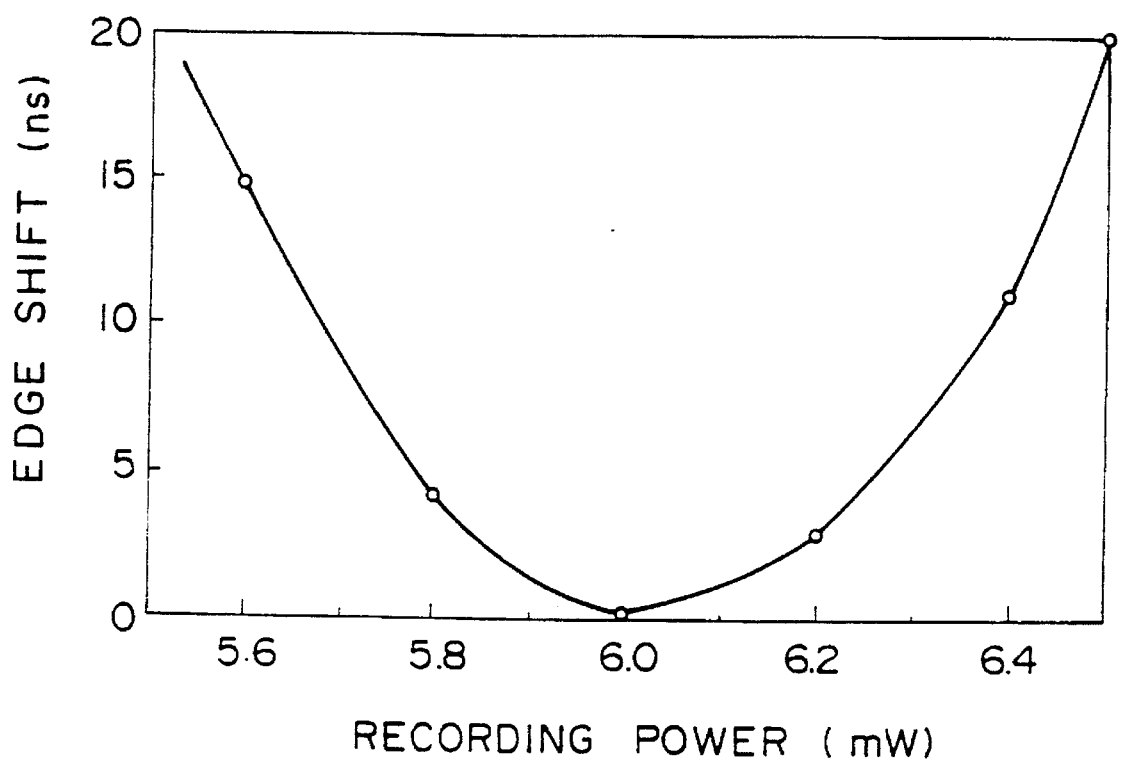
FIG. 5 is a graph showing the relation between the recording power and the edge shift amount.

In an embodiment to be described below, the edge shift is suppressed by controlling the recording laser power. A disc used has a similar structure to that of the aforementioned first and second embodiments. In this embodiment, a change in edge shift was examined when the laser power was changed between Pw=6.0 mW and Pw=6.5 mW at a disc position represented by r=60 mm. Optimum laser power at this position is power which maximizes the carrier to noise ratio (C/N) and its value is 6 mW. Recording was carried out by changing the recording laser power to obtain results as shown in FIG. 5. When recording was effected at standard Pw=6 mW, an edge shift of 1 ns was obtained. Contrary to this, the edge shift was 3 ns at Pw=6.2 mW, it was 9 ns at Pw=6.4 mW and it increased to 20 ns at Pw=6.5 mW. Conversely, measurement was conducted by decreasing power and in this case, when the Pw was changed from 5.8 mW to 5.6 mW and then to 5.4 mW, the edge shift amount increased from 4 ns to 15 ns and then to 50 ns or more. In this manner, as the recording power varies, the edge shift amount also varies.

This corresponds to the cases where the laser power varies owing to not only a variation in laser but also a variation in performance of the laser driver and a contaminated head. Accordingly, the controllability of laser power can be improved by eliminating above-described various causes. Necessary accuracy depends on the shift amount to be controlled but especially when recording conditions are desired to be controlled by laser power while keeping the pulse width constant, highly accurate controllability is required.

In accordance with the above-described embodiments, a controlling method at optical records under highly accurate control can be realized wherein recording and reading of a test pattern is effected by controlling the defocus amount of a laser beam on a recording medium to within a predetermined range during recording of the test pattern, by controlling the shift amount of a recording position on a track at which recording is effected on the recording medium to within a predetermined range or by controlling the shift amount of laser power irradiated during recording to within a predetermined range.

Figure 6:
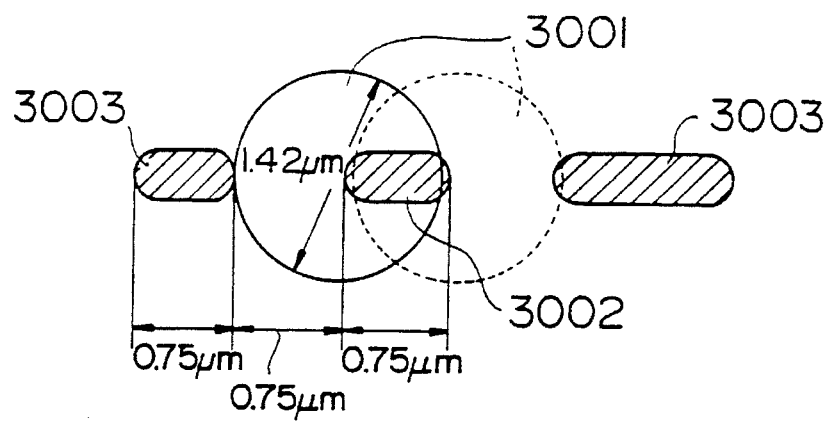
FIG. 6 is a diagram for explaining the relation between a light spot and an edge.

Next, waveform equalization conducted for a reproduction signal processing in accordance with the present invention will be described in detail. When a case is considered as an example wherein laser has a wavelength of 0.78 μm and an objective lens has a numerical aperture N.A. of 0.55, a light spot defined on condition that beam intensity becomes $1/e^2$ has a diameter of $\lambda/\text{N.A.}=1.42$ μm. In realizing a line record density of 0.56 μm/bit in mark length recording using 1–7 modulation, a minimum mark length and a minimum gap distance are each 0.75 μm. When the position of an edge is read with the center of a light spot 3001 positioned at the fore edge or the back edge of a recording mark 3002 as shown in FIG. 6, the skirt of the beam slightly entangles the back edge of a recording mark 3003 or the fore edge of another recording mark 3003, the recording marks 3003 being 0.75 μm spaced apart from the recording mark 3002 frontally and rearwardly thereof, respectively. Consequently, even when the edge position of a recording mark is read with an ideal light spot, a read-out signal waveform is deteriorated because of inter-code interference and information at the edge position cannot be read correctly. Further, in an optical head used in a practical optical disc apparatus, there occur various kinds of aberrations due to irregularity in adjustment of the optics and the disc exchange and therefore, deterioration of spot shape cannot be avoided to thereby deteriorate the read-out signal waveform significantly.

Problematic aberrations will be described briefly hereinafter.

Figure 7:
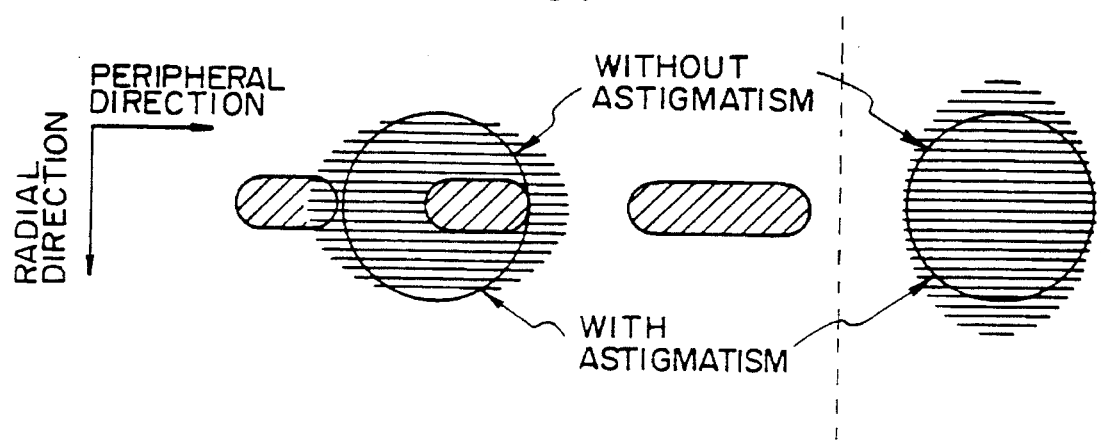
FIG. 7 is a diagram showing shapes of light spots in the presence of astigmatism.
Figure 8:
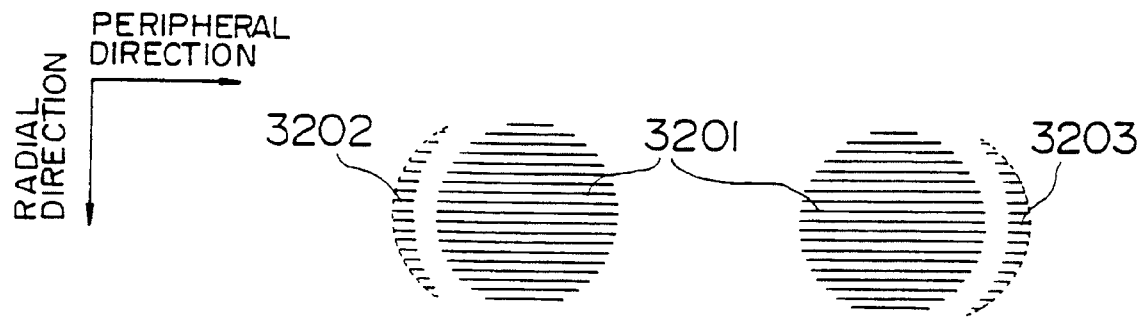
FIG. 8 is a diagram showing shapes of light spots when parallelism between an objective lens and a disc substrate is disturbed.

Firstly, in the presence of astigmatism, when the light spot is under-focused or over-focused relative to the position of a minimum scattering circle, the light spot takes, as shown in FIG. 7, the form of an elliptical spot which spreads in the peripheral direction or the radial direction of the disc. Especially, when astigmatism takes place in the peripheral direction, inter-code interference is increased upon edge reproduction. In addition, there are in focus servo of light spot a residual of follow-up of the objective lens in compliance with a vertical deflection of the disc surface, a matching error in the optics for detection of an in-focus position and an electrical offset occurring in the servo circuit system, and it is necessary to predict a defocus amount of typically about ±1 µm due to these factors. The beam focused by the objective lens takes the form of a circular spot of $\lambda$/N.A. diameter at the in-focus position but its spot diameter increases abruptly when focusing deviates from the in-focus position, giving rise to a cause of increasing the inter-code interference amount. Further, in the event that the disc substrate is inclined toward the disc peripheral direction or vice versa and the parallelism between the disc substrate and the objective lens is disturbed, a coma aberration takes place in the peripheral direction as shown in FIG. 8, causing a side spot 3202 or 3203 frontally or rearwardly of a main light spot 3201. Being different from the astigmatism and defocus, this side spot applies inter-code interference to either one of the front and rear edges.

In the present invention, the inter-code interference due to various kinds of aberrations enumerated above is suppressed by reproduction waveform equalization in which equalizing constants are fixed.

A waveform equalizer is constructed in the form of, for example, a transversal filter of three taps as shown in FIG. 9. An optomagnetic signal MO(t) obtained through the differential detection method is passed through two delay elements 3301 and 3302 to provide three signals S1(t), S2(t+D) delayed by D(ns) from S1(t) and S3(t+2D) delayed by D(ns) from S2(t+D), where t represents time. The above three signals are respectively amplified by k1, k2 and k3 at variable gain amplifiers 3303, 3304 and 3305, respectively, and the amplified signals are inputted to an adder 3306 to produce an equalizing output EQ(t) which is delivered out of the adder. Since, in the mark length recording using 1–7 RLL modulation, the detection window width is Tw(ns), the minimum mark length and the minimum gap distance are each 2 Tw(ns). Therefore, the delay time D is so set as to be equal to 2 Tw(ns) in order that intercode interference at a position which is 2 Tw distant from the edge position can be reduced. Also, since the ZCAV system is adopted in the present invention as described previously, the 2 Tw time interval changes between 80 ns (innermost periphery) and 40 ns (outermost periphery) in correspondence to respective zones. Therefore, delay times of the delay elements 3301 and 3302 must be variable. An example of construction of the delay element having variable delay time will be described herein by referring to an exemplary delay element as shown in FIG. 10 wherein the delay time is set table with 3 bits (at 8 steps). A fixed delay element 3401 having a delay time of 42.5 ns is connected in series with 7 fixed delay elements 3402 each having a delay time of 5 ns, analog signals at respective junctures are inputted to an analog multiplexer 3403, and an output signal 3405 is selected by a digital signal 3404 of three bits. Through this, a delay element can be realized in which the delay time can be varied between 42.5 ns and 77.5 ns at intervals of 5 ns by using a setting signal of three bits b0, b1 and b2, as summarized in a correspondence table of FIG. 11. The number of bits necessary for setting the delay time may be determined in accordance with the number of zones employed in the ZCAV system and besides, in consideration of simplification of the circuit construction, a plurality of consecutive zones may be ganged into one group and the delay time may be set group by group. Further, the method of varying the delay time and the variable delay element are in no way limitative in the present invention.

The procedure of setting the equalizing constants k1, k2 and k3 will now be described. As described previously, in the optical disc, aberrations of a reading light spot have an effect on the occurrence of inter-code interference. Then, the magnitude of the aberrations varies with each apparatus and each disc used and therefore it is preferable to optimize the constants k1, k2 and k3 such that the inter-code interference can be reduced to a minimum within a range of allowable irregularity of aberration. It should be noted that k2 does not participate in determining the reproduction signal amplitude and therefore it will be described as constant 1 hereinafter. Also, the following description will be given on the assumption that frequency characteristics will not be deteriorated by the delay elements and amplifiers within the signal band.

In setting optimum equalizing constants k1 and k3, the influence of a fixed component of aberration which is almost determined during at least assembling of the apparatus and the influence of a variable component of aberration due to the use of exchangeable discs must be taken into consideration. In the following, setting of the equalizing constants will be described in detail by taking the magnitude relation between the variable component due to the use of exchangeable discs and the fixed component into consideration.

(1) In a case where values of k1 and k3 are set to be substantially equal to each other The aberration liable to vary through the use of exchangeable discs is a coma aberration. A relative inclination between the disc substrate and the head leads to the occurrence of the coma aberration and when an inclination caused during mounting of the head is used as a reference, a (+) inclination and a (−) inclination are predicted to occur depending on the posture of the disc. As a result, a side spot as shown in FIG. 8 will occur in the scanning direction of the main light spot 3201 frontally or rearwardly thereof. The influence of a side spot occurring in the scanning direction of the main light spot 3201 frontally thereof can be reduced by asymmetric equalization defined by, for example, k3>k1. However, when a difference occurs between one apparatus and another or between one disc and another and a side spot 3203 occurs in the scanning direction of the main light spot 3201 rearwardly thereof, the asymmetric equalization defined by k3>k1 will increase inter-code interference conversely. This corresponds to the case where in inclination between the head and the disc, a variation in inclination due to a difference between one disc and another is predominant. In such a case, it is advantageous to adopt symmetric equalization in which values of k1 and k2 are made to be substantially equal to each other. "Substantially" referred to herein compromises with the fact that even when recording control fulfills itself, front and rear edge shapes of a recording mark may slightly differ from each other. For example, when the curvature of a front edge is larger than that of a rear edge, it is preferable that k1 be set to be slightly larger than k3. In the following description, on the assumption that a recording mark has the same curvature at its front and rear edges, $k1=k3=-k$ is set up and k is called an equalizing constant. Then, the equalizing constant k is optimized on the assumption that an astigmatism amount up to $0.15 \lambda$, a peripheral direction coma aberration amount up to $0.15 \lambda$ and a defocus amount of $\pm 0.8$ μm are allowed. The magnitude of the astigmatism and peripheral direction coma aberration is normalized for display by the wavelength $\lambda$ of laser.

Figure 12:
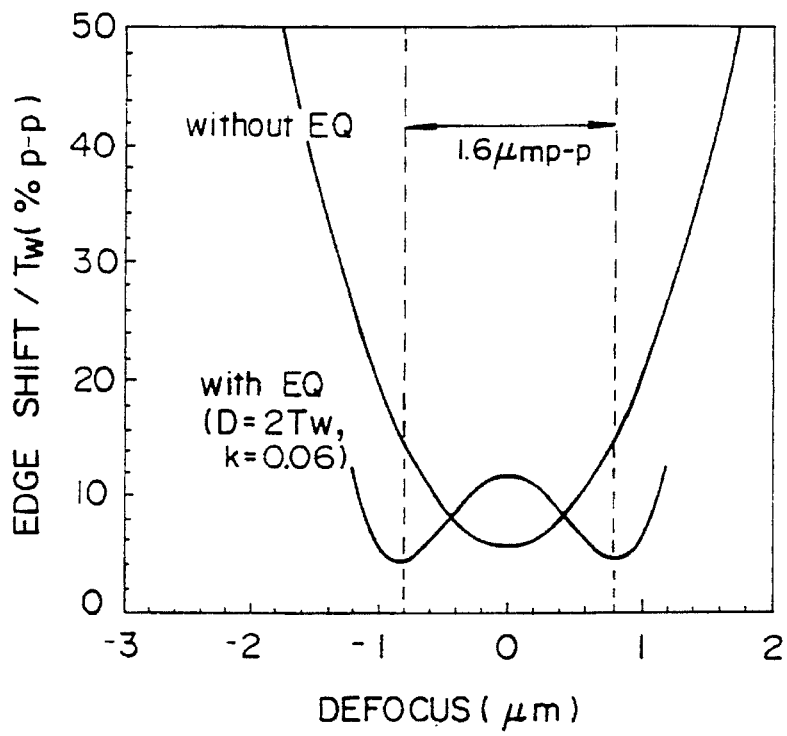
FIG. 12 is a graph showing edge shift amounts obtained when only defocus is taken into consideration in the absence of astigmatism and coma aberration.
Figure 13:
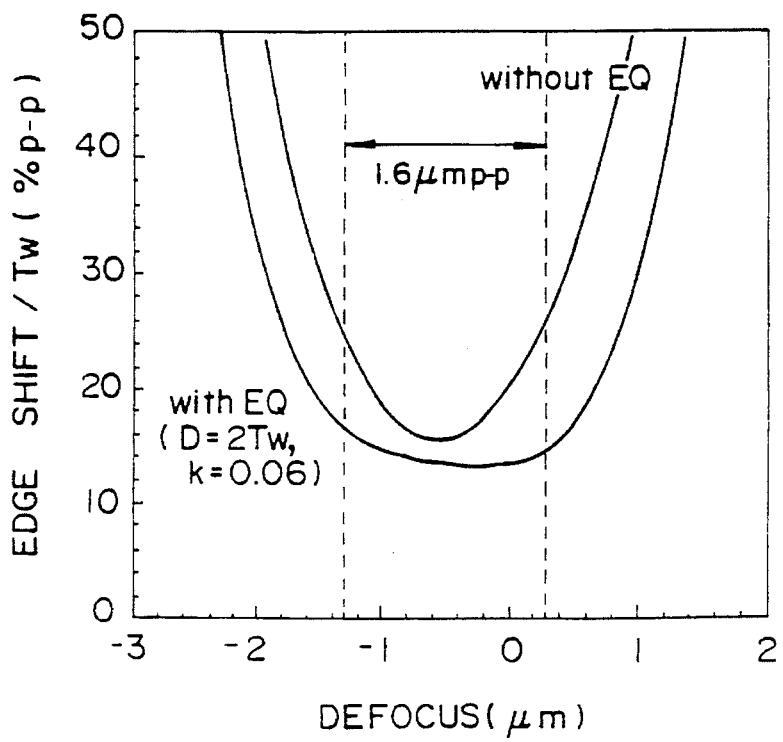
FIG. 13 is a graph showing edge shift amounts obtained when astigmatism, coma aberration and defocus are taken into consideration.
Figure 14:
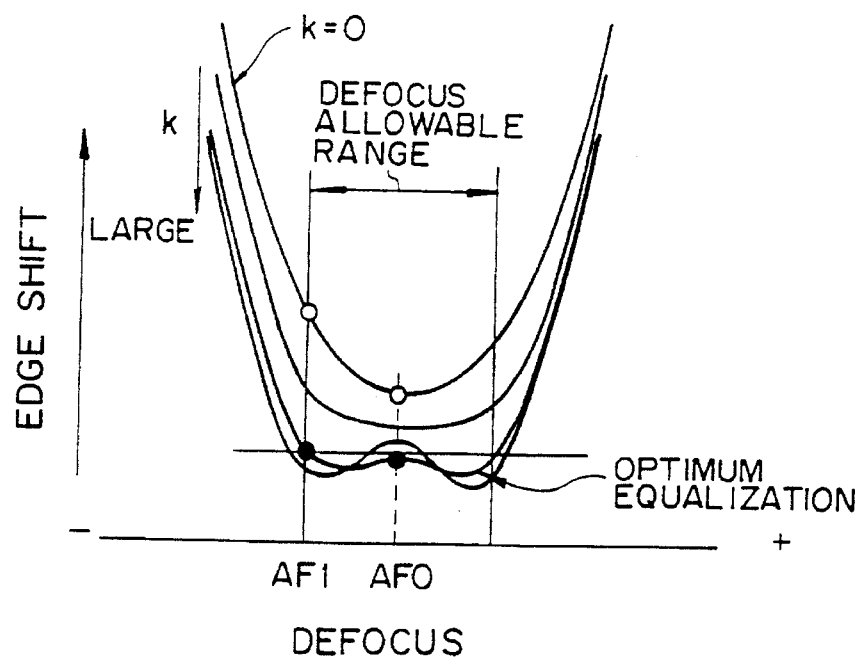
FIG. 14 is a graph for explaining setting of equalizing constant k.

Firstly, edge shift amounts occurring during reproduction are determined on the assumption that only a defocus of $\pm 0.8$ μm is present in the absence of astigmatism and coma aberration. Results are shown in FIG. 12. In the present invention, the front and rear independent edge detecting system based on original waveform slice is adopted. Therefore, when a reproduction signal waveform is sliced at an eye center level of an eye pattern of the read-out signal waveform, a width of distribution of intersections of front and rear edges with the slice level is determined and the distribution width is normalized by a discrimination window width Tw to provide an edge shift amount (hereinafter, the procedure will be treated similarly). One of the front and rear edge shift amounts which is larger than the other is shown in FIG. 12. The edge shift amount before equalization (k=0) has dependency on defocus represented by a bucket curve which takes a minimum value at a defocus of 0 μm and a maximum of 15% p—p at a defocus of $\pm 0.8$ μm. As the equalizing constant k is increased from 0 (zero), ends of the bucket curve are lowered and the center thereof is raised. For k=0.06, the value at the center is increased to 12% p—p but within the range of $\pm 0.8$ μm defocus, the edge shift can be suppressed from 15% p—p to 12% p—p. Subsequently, the edge shift amount occurring during reading is determined on the assumption that the astigmatism amount is $0.15 \lambda$, the peripheral direction coma aberration amount is $0.15 \lambda$ and the defocus is $\pm 0.8$ μm, providing a bucket curve as shown in FIG. 13. The edge shift amount before equalization takes a maximum of 26% p—p in terms of the discrimination window width ratio, which maximum is about 10% larger as compared to the case of FIG. 12 where only the defocus is present. This increase corresponds to deterioration due to the astigmatism and the coma aberration. In this case, too, as the equalizing constant k is increased from 0, ends of the bucket are lowered to provide a saddle curve which is raised at the center and in which a maximum value of edge shift for k=0.06 is suppressed to 16% p—p. If the k is more increased, the shift amount at the center is increased as in the case of FIG. 12, eventually resulting in loss of the edge shift amount reduction effect. More particularly, the equalizing constant k is set within a range in which the magnitude relation between the edge shift amount at a point AF0 for its minimum and the edge shift amount at a point AF1 for its maximum is not inverted to that shown in FIG. 14 within the defocus allowable range.

The above results show that when an astigmatism amount up to $0.15 \lambda$, a coma aberration amount up to $0.15 \lambda$ and a defocus amount of $\pm 0.8$ μm are allowed, the worst value of the edge shift amount during reading can be reduced from 26% p—p to 16% p—p by setting k=0.06.

Figure 15:
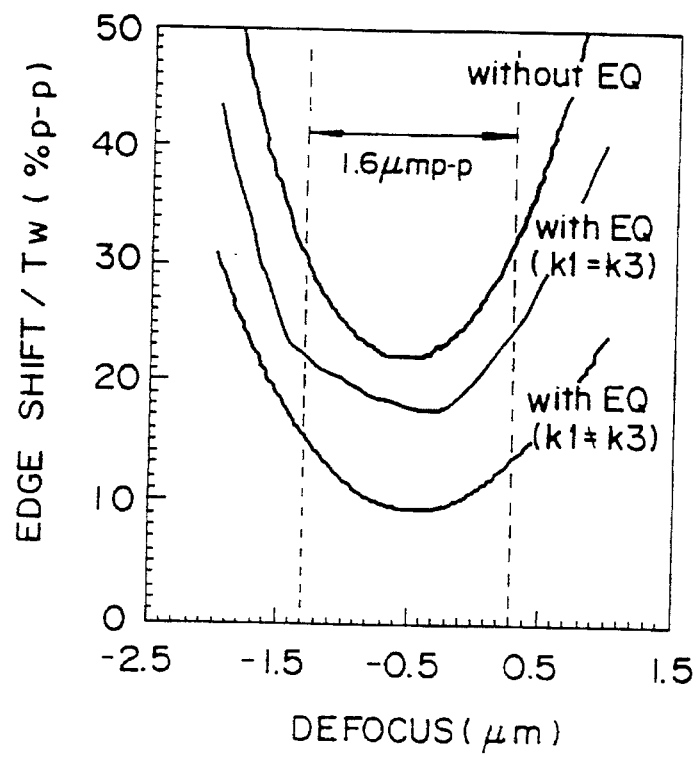
FIG. 15 is a graph for explaining comparison of edge shift amounts before and after equalization.

(2) In a case where values of k1 and k3 are set differently in inclination between the head and the disc, when a variation in inclination due to a difference between one disc and another is small, inter-code interference can be reduced efficiently by setting values of k1 and k3 such that the influence of inclination due to a residual of adjustment during mounting of the head is eliminated. As an example, the edge shift amounts before and after equalization are determined on the assumption that an astigmatism amount of $0.15 \lambda$, a peripheral direction coma aberration amount of $0.2 \lambda$ and a defocus amount of $\pm 0.8$ μm are allowed. The results are compared as shown in FIG. 15. The edge shift amount which has been 30% p—p before equalization is reduced to 16% p—p. As will be seen from comparison of this example with the case of FIG. 13, the allowable range of the peripheral direction coma aberration is broadened by $0.05 \lambda$.

In the present embodiment, delay time D has been described as being set to 2 Tw but this value is not limitative and the present invention may be applied to a case where D is set to, for example, Tw or 1.5 Tw, by merely changing optimum setting values of the equalizing constants.

Figure 16:
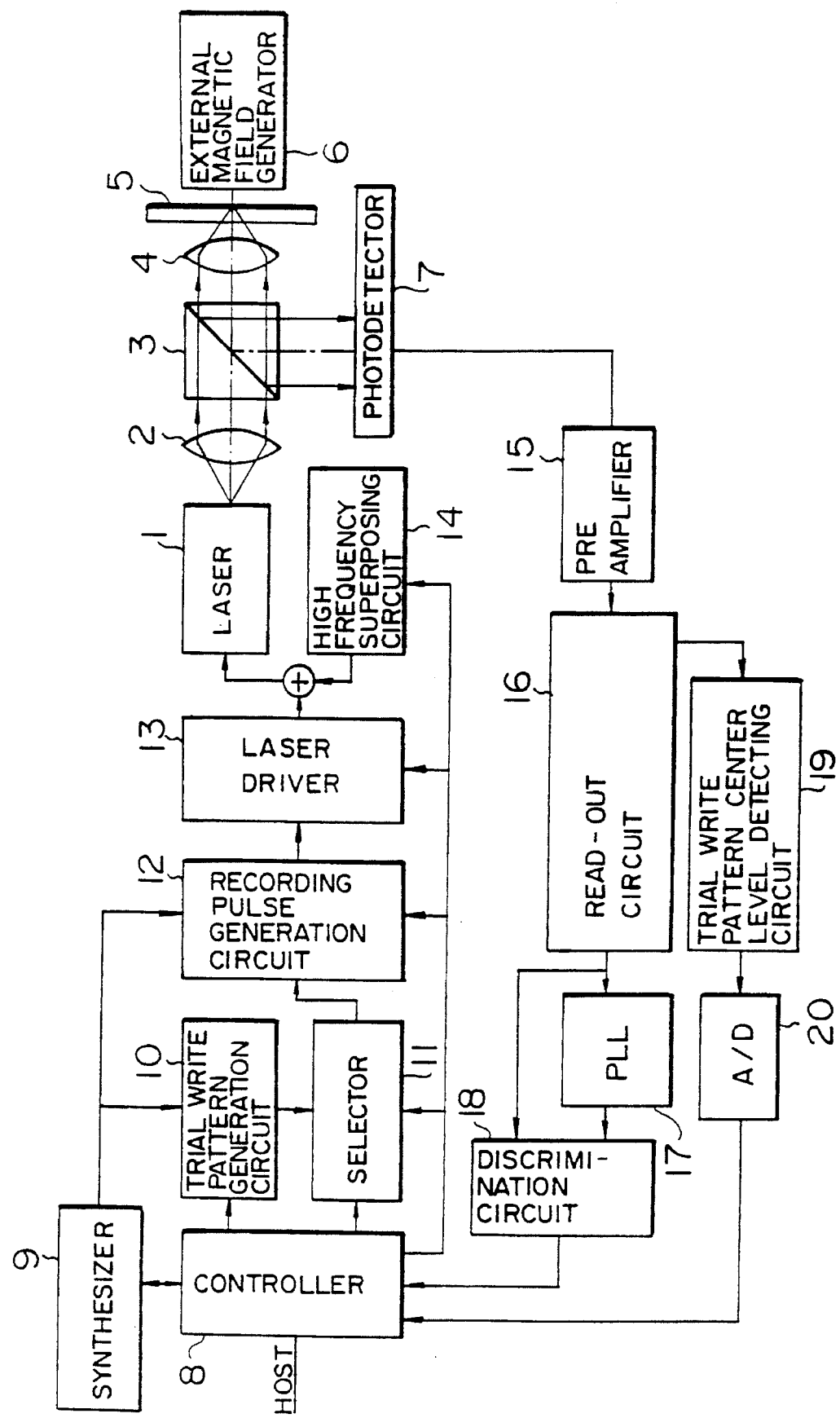
FIG. 16 is a block diagram for explaining another embodiment of the invention.

A still another embodiment of the present invention will be described hereunder. FIG. 16 shows an embodiment of construction of the apparatus according to the invention. The information recording and reproducing apparatus comprises an optical head mainly including a laser 1, a recording processing system mainly including a recording medium 5 for storing information and a recording pulse generation circuit 12, and a reading processing system mainly including a reading circuit 16 for converting a read-out signal produced from the optical head into information. The recording medium 5 consists of a recording film and a substrate for holding it.

An instruction and information data from a host are subjected to instruction decoding and recording data modulation so as to be converted into a code string corresponding to the modulation system. A synthesizer 9 is an oscillator for generating a reference clock used for the entire apparatus. When a recording method called ZCAV (Zoned Constant Angular Velocity) in which the reference clock is changed zone by zone to make recording density at inner and outer peripheries substantially constant is employed as a technique for enlargement of capacity, the oscillation frequency of the synthesizer 9 must be changed in accordance with the zones.

In trial write operation, for the sake of improving the compatibility of a recording medium with an apparatus used for recording, a trail write pattern, which is used to detect a variation in thickness of a recording medium occurring upon exchange of the recording medium and a variation in sensitivity to recording on the recording medium due to a change of ambient temperature and to a change of characteristics of the apparatus, is written at a predetermined position on the recording medium in advance of recording of regular information. This trial write pattern is generated by a trail write pattern generation circuit 10 and is converted into a code string corresponding to the modulation system.

The code string modulated with regular information data and produced from the controller 8 and the code string produced from the trial write pattern generation circuit 10 are inputted to a selector 11 which is responsive to a control signal from the controller 8 to switch the the former or latter code string in compliance with a regular recording processing or a trial write processing. The selected code string from the selector 11 is applied to a recording pulse generation circuit 12 so as to be converted into a recording pulse train for controlling the length and width of a recording mark. The recording pulse train is inputted to a laser driver 13, the laser driver 13 produces a recording current which causes the laser 1 to oscillate at a high output, light emitted from the laser 1 is collimated by a first lens 2 to a parallel beam, and the parallel beam passes through a prism 3 and is focused by a second lens 4 on the recording medium 5 to record a recording mark in compliance with the code string. A high frequency superposing circuit 14 is adapted to reduce laser noise due to the laser 1. During recording and erase operation, the high frequency superposition may sometimes be stopped from the standpoint of life of the laser.

During reproduction, the laser 1 is caused to oscillate at a low output, and output light impinges on the recording medium 5. Reflection light from the recording medium 5 is split by the prism 3 to a light path so as to be incident on a photodetector 7. The incident light is subjected to photoelectric conversion in the photodetector 7, and a resulting electric signal is amplified by an amplifier 15 and inputted to a reproduction circuit 16. The reproduction circuit 16 is comprised of a waveform equalizing circuit, an automatic gain control circuit and a binary conversion circuit and is operative to convert an inputted reproduction signal into a binary signal. The binary signal produced from the reproduction circuit 16 is inputted to a PLL (Phase Locked Loop) circuit 17 for the purpose of self-clocking. The binary signal and a reproduction clock synchronous therewith are inputted to a discrimination circuit 18 for the purpose of data discrimination and a resulting data discrimination signal is inputted to the controller 8 to thereby demodulate data. In the magneto-optical disc apparatus for performing recording, reproduction and erase of information by using an externally applied magnetic field, an external magnetic field generator 6 is provided and recording/erase power is irradiated while switching the direction of the magnetic field during recording/erase operation. During reproduction, the reflection light may be split by a wavelength plate (not shown) disposed in front of the photodetector 7 into p-polarized light and s-polarized light which may be differentiated by the photodetector (2 divisions) 7 to obtain an optomagnetic signal.

During the trial write processing, a read-out signal in the form of an analog signal is derived from the reading circuit 16 and led to a trail write pattern center level detecting circuit 19. As a recording pattern used during the trial write processing, a densest pattern of the highest frequency and a thinnest pattern of the lowest frequency are used in combination. In the reproduction signal, a center level of the densest pattern and a center level of the thinnest pattern are detected by means of the trial write pattern center level detecting circuit 19, a difference between the center levels is taken into the controller 8 through an A/D converter 20, and recording power obtained when the difference is zero is decided to be optimum recording power. Regular recording is carried out using the optimum recording power. In this manner, optimum power can always be set through the trial write to thereby permit recording of a highly accurate recording mark.

Figure 17:
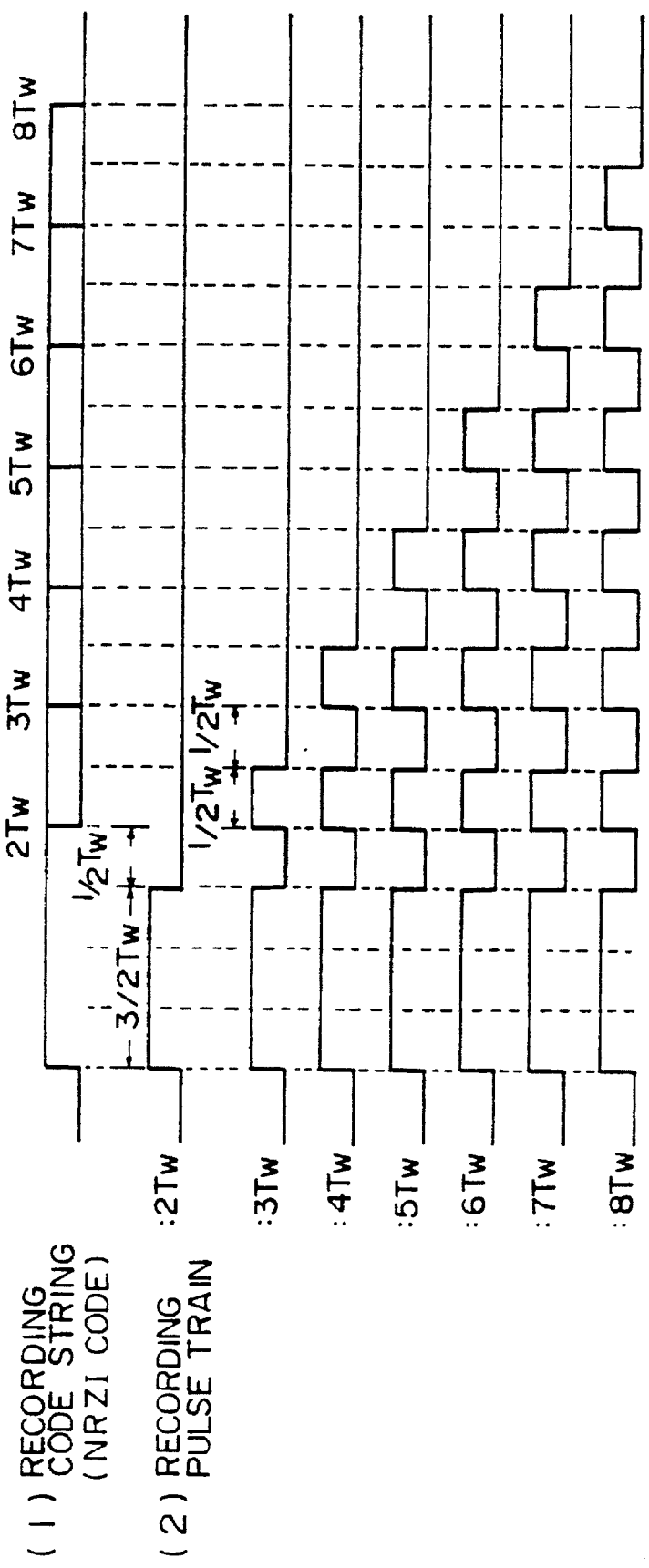
FIG. 17 is a timing chart for explaining a recording code string used and recording pulse trains.

FIG. 17 shows an embodiment of the recording system for recording on the recording medium according to the present invention. Described herein is a case where a (1, 7) RLL code is used for the modulation system. Of the code string modulated in compliance with regular information data and delivered out of the controller 8 and the code string produced from the trial write pattern generation circuit 10 as described in connection with FIG. 16, one outputted from the selector 11 forms a recording code string. In the case of the (1, 7) RLL code, the recording code string appears in seven ways of 2 Tw to 8 Tw and it is a NRZI (Non Return to Zero Inverse) signal whose polarity is inverted at a modulation code of "1" for the purpose of mark edge recording. Here, Tw represents a window width and the period of the reference clock oscillated by the synthesizer 9 equals Tw. When a 5-inch optical disc undergoes recording and reproduction at a rotation number of 3000 rpm, the transfer speed which is 2 MB/s at the inner periphery and 4 MB/s at the outer periphery can be realized for the recording pit length being 0.75 μm in the case of the (1, 7) RLL code and in that case, Tw is a time of 40 ns at the inner periphery and a time of 20 ns at the outer periphery. The recording pulse generation circuit 12 generates a recording pulse train corresponding to pulses of the recording code string. In the recording pulse train, the head pulse and the second and ensuing pulses are different in length, that is, the head pulse has a pulse width of 3/2 Tw which is shorter than the minimum pulse width 2 Tw by 1/2 Tw. The pulse width after 3 Tw inclusive is obtained by adding to the head pulse 3/2 Tw a combination of the pulse width 1/2 Tw of the second and ensuing pulses and a gap width of 1/2 Tw (the combination being equal to the reference clock waveform). These pulses are generated in synchronism with the reference clock. Through this, control of the pulse width and pulse interval can be improved.

Figure 18:
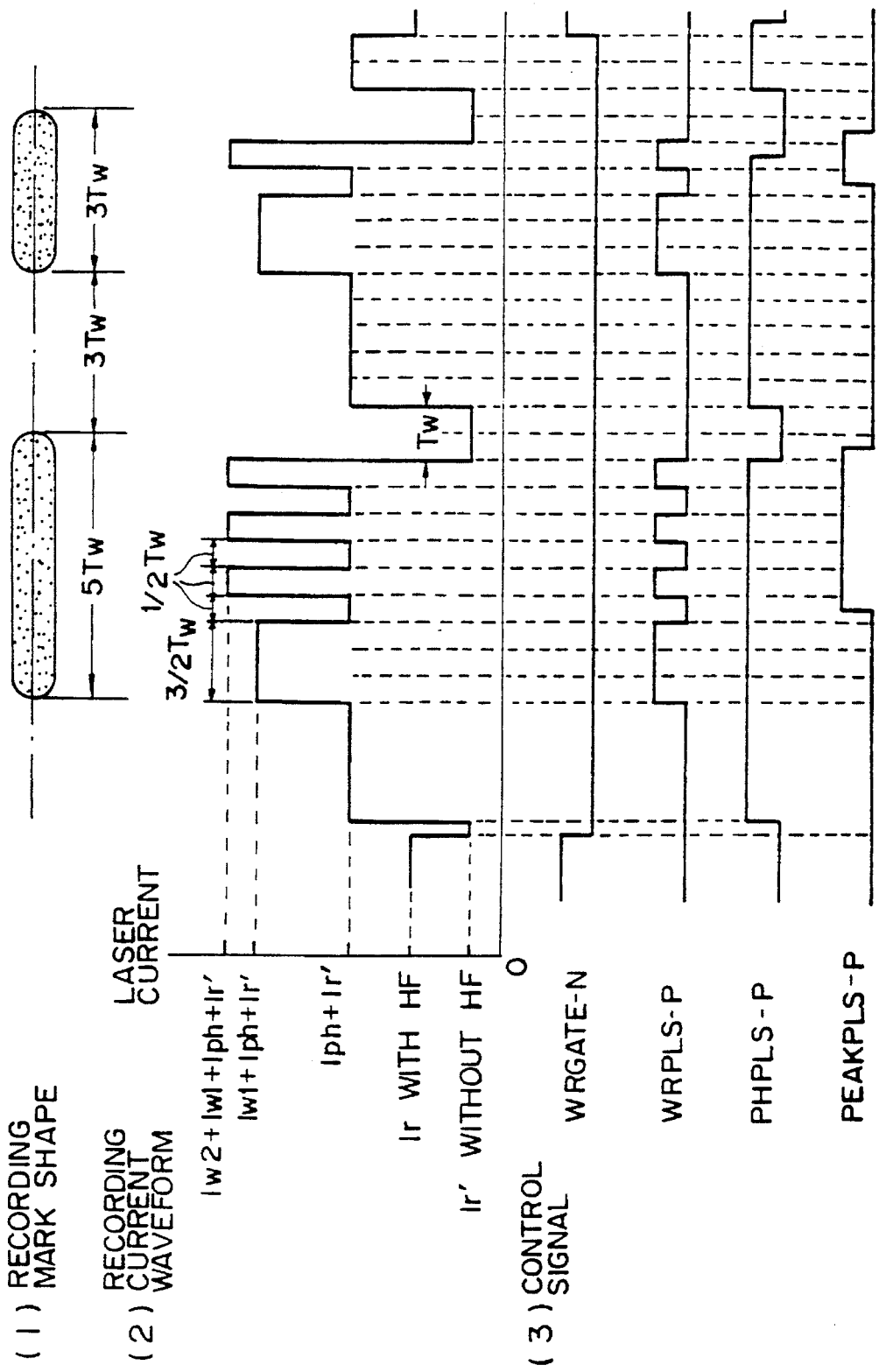
FIG. 18 is a waveform diagram showing a recording current waveform.

FIG. 18 shows recording mark shapes, recording current waveforms of laser and control signals. A recording current waveform of laser is constructed of a combination of a recording pulse train and a gap, and after the back edge of each recording pulse train, a pause period is provided having a time width determined by a recording auxiliary pulse. The recording auxiliary pulse sets up a gap portion of a time width (for example, Tw) following the fall position of a recording pulse train in order that heat generated from the final fall position of the recording pulse train will hardly change the temperature at the heading rise position of the next recording pulse train. Laser power is set to, for example, five power levels which include reproduction power Pr during reading, read power Pr' corresponding to the former read power which is reduced by a degree of modulation to stop the high frequency superposition during recording, recording power Pph by the recording auxiliary pulse, recording power Pw1 of the head pulse, and recording power Pw2 of the second and ensuing tailing pulses. In order to realize the above power levels, current sources are provided including a current source Ir' obtained from an APC (Auto Power Control) for keeping the reading power constant, a current source Iph for recording auxiliary pulse which is superposed on Ir', a current source Iw1 for head pulse to be further superposed, and a current source Iwr necessary for generating trailing pulses. Intended recording waveforms of the recording auxiliary pulse power Pph, the head pulse power Pw1 and the trailing pulse power Pw2 can be obtained by driving the laser to emit light with currents Ir'+Iph, Ir'+Iph+Iw1 and Ir'+Iph+Iw1+Iw2, respectively. During reproduction reading, Ir' is added with a current Ihf from the high frequency superposing circuit to realize a reading current Ir. Next, the control signal during recording will be described. A gate signal WRGATE-N indicates a recording state and it is enabled in a recording data area within a normal sector. This gate signal is also used as an ON/OFF control signal for the high frequency superposing circuit and it is rendered to be ON during reading and OFF during recording. A control signal WRPLS-P corresponds to the recording pulse train. A signal PHPLS-P is for generation of the recording auxiliary pulse and it has a pause period of Tw at the back edge of each recording pulse train for the purpose of heat blocking. A control signal PEAKPLS-P is used for raising the power level of trailing pulses to above that of the head pulse. These control signals are inputted to an arithmetic circuit 21 included in the laser driver as shown in the following FIG. 19A. In a magneto-optical disc apparatus which cannot undergo overwrite, control signals used during erase are WRPLS-P, PHPLS-P, PEAKPLS-P and WRGATE-P (signal having opposite polarity to that of WRGATE-N signal) wherein the WRPLS-P, PHPLS-P and PEAKPLS-P have the same waveform as that of WRGATE-P to permit erase of data. In the above recording waveform, the power level of the head pulse is set to be lower than that of trailing pulses. Through this, a recording mark width due to the head pulse can be equal to that of a trailing pulse and the recording mark length can also be controlled highly accurately. This signifies that the temperature in recording medium generated by the head pulse and that generated by a trailing pulse are made to be constant and as a result, the recording mark width is made to be constant, thereby ensuring that the width of a reproduction signal representative of a data part obtained by reproducing the recording medium can be made to be constant. By directly slicing the read-out signal at the center or at a certain level, a binary signal can be produced. When the recording pulse train and the recording auxiliary pulse are used in combination, overwrite can be realized in a magneto-optical disc as described in JP-A-62-175948 which is formed of an exchange bond film and which can permit overwrite, by using the power level of the recording auxiliary pulse as erase power and using the power of the recording pulse as recording power.

Figure 19A:
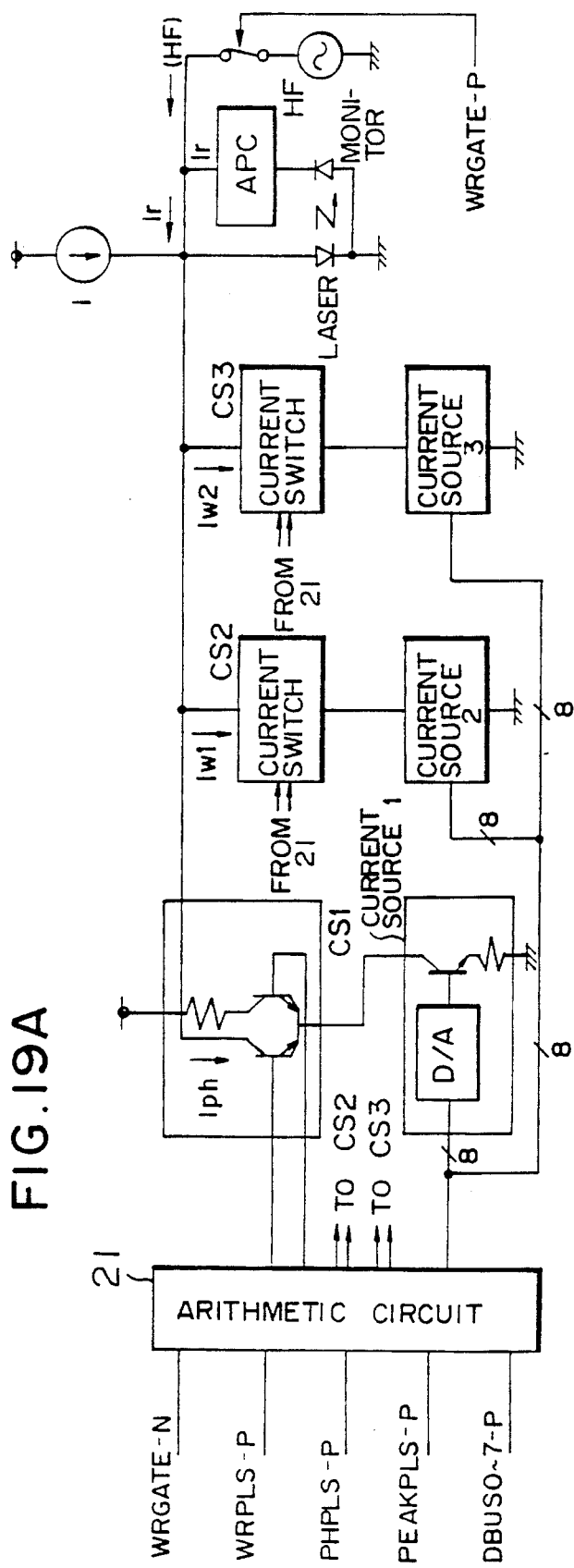
FIG. 19A is a block diagram of a laser driver.
Figure 19B:
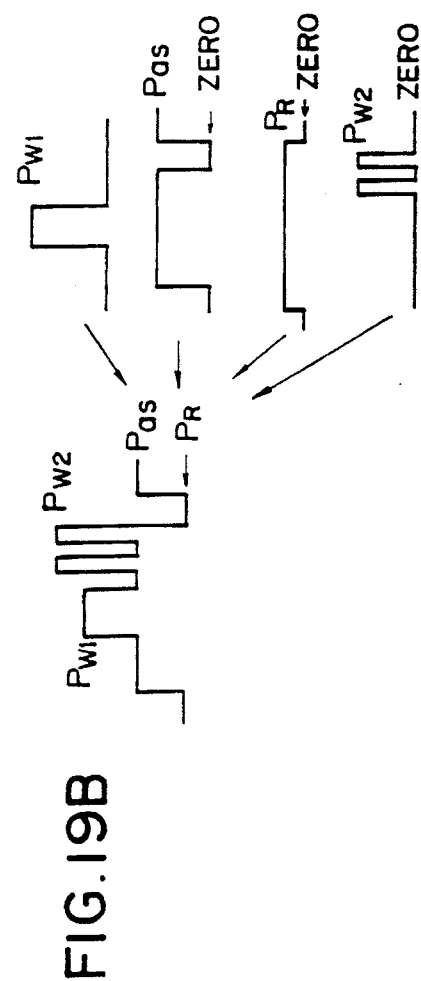
FIG. 19B is a diagram for explaining synthesis of waveforms by the laser driver.

FIG. 19A shows an embodiment of the laser driver for generating recording waveforms of the laser. In correspondence to the recording waveforms, there are provided current sources Iw1, Iw2 and Iph as well as a current source Ir' obtained from APC (Auto Power Control) for keeping the reproduction power constant. The current sources Iw1, Iw2 and Iph need to be variable in the respective zones in compliance with ZCAV and this can be realized by setting zone data from the controller 8 in D/A converters provided in the respective current sources through a data bus DBUS0~7-P. The output gain of the D/A converter is adjusted to provide a predetermined power level in consideration of the light emission efficiency of laser and the utilization efficiency of the optical head. This can be realized by storing data for adjustment in, for example, an EEPROM of each D/A converter. The respective current sources are connected to current switches CS1, CS2 and CS3, switchable at high speeds, and high-speed switching is executed by recording pulse control signals shown in FIG. 18 to produce a desired recording current waveform. In this circuit, to comply with high-speed switching of the positively driven laser, npn type transistors, switchable at high speeds, are used in place of pnp type transistors. A total of currents of the D/A converters provided in the respective current sources is passed through the current source—by means of a current mirror circuit (not shown), and current is drawn to the current switch by means of each current switch to thereby control current to be passed to the laser. In the case of a negatively driven laser, this can be realized by adding currents of the respective current sources. The high frequency superposing circuit responds to the control signal WRGATE-P to be turned ON during reproduction or to be turned OFF during recording. As the switches used herein, PIN diodes described in JP-A-63-90037 may preferably be used. The laser driver of FIG. 19A uses four power levels Ph, Pas, Pw1 and Pw2 and therefore it consists of four systems. The respective levels are prepared independently and eventually are synthesized. The timing for synthesis is set up by a write clock so as to form a waveform as shown in FIG. 19B.

Figure 20:
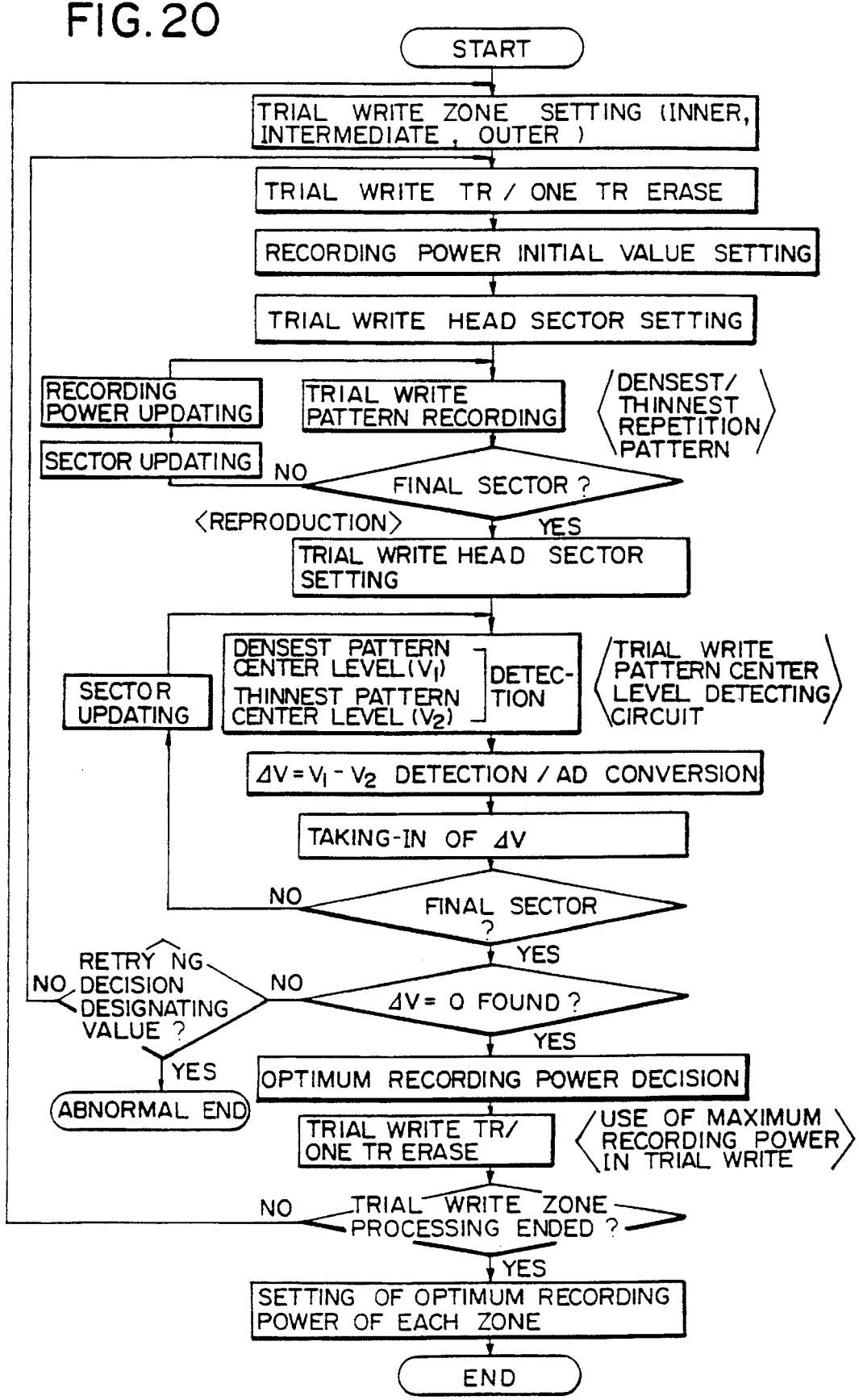
FIG. 20 is a flow chart showing an example of the trial write procedure.

In the trial write processing, for the sake of improving the compatibility of a recording medium with an apparatus used for recording, a variation in thickness of a recording medium occurring upon exchange of the recording medium and a variation in sensitivity to recording on the recording medium due to a change of ambient temperature and a change of characteristics of the apparatus are detected and written at a predetermined position on the recording medium in advance of recording of regular information so that recording may always be executed under an optimum condition. FIG. 20 shows an example of a flow chart of the trial write processing procedure. In the case of ZCAV, several tracks for trail write are located in each zone. For example, on the basis of results of trial write at three inner, intermediate and outer periphery zones, the recording condition for all zones can be set. Firstly, the optical head is positioned to the inner trial write track. Here, a predetermined trial write track is first erased to make it ready for trial write. Erase power at that time must be set to a high level by predicting all ambient temperatures (for example, erase power at 0° C.). Subsequently, trial write recording start power is set. The setting power at that time must be low and it may be, for example, recording power at 50° C. If a trial write head sector is detected at the track of interest, recording of a trail write pattern is started.

Figure 21:
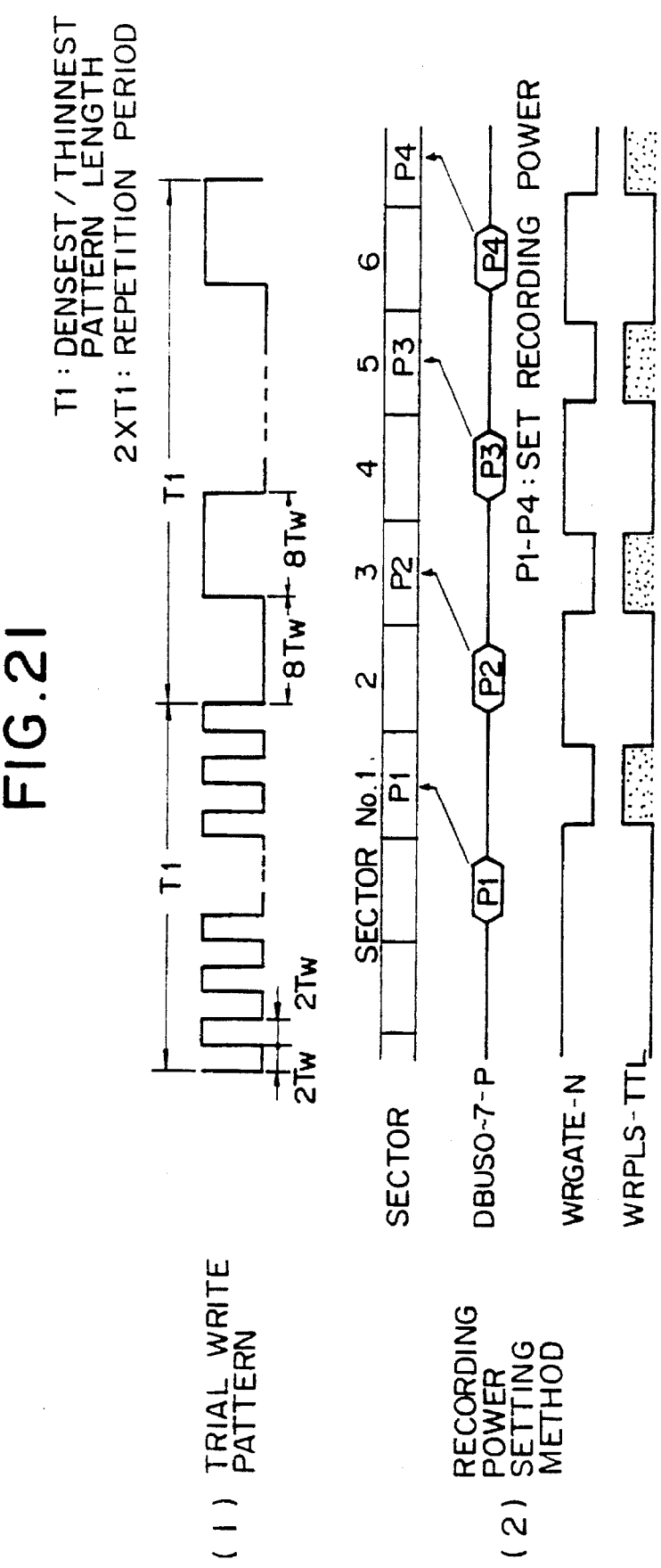
FIG. 21 is a diagram for explaining an example of a trial write pattern and a recording power setting method.

FIG. 21 shows an example of a trail write pattern and a recording power setting method. Used as a trial write pattern is a repetition pattern of a densest pattern of the highest frequency in the apparatus in question (2 Tw in the case of (1, 7) RLL code) and a thinnest pattern of the lowest frequency (8 Tw). In the case of mark edge recording, time axis control of a recording mark is important and control of the time axis of the respective patterns is determined to be completed by equality of center levels of reproduction signals indicative of the densest pattern and the thinnest pattern. Recording power at that time is made to be optimum power. Thus, in the present embodiment, a variation in time axis is detected in terms of a variation in amplitude level. The recording power is one condition for one sector and is updated by sequentially updating sectors. In the case of ZCAV, the controller must set the recording condition in the laser driver through the data bus DBUS0 ~7-P and in consideration of the setting time, recording is done on the sector at least every other sector (FIG. 21). The number of recording conditions per one processing which is about 5 to 10 is sufficient, and when the pit length is 0.75 μm, the number of sectors is about 30 at the innermost periphery of a 5-inch disc in the case of a 1024 B/sector format and therefore the recording processing ends within one track. In that case, if the repetition period of a set of a densest pattern and a thinnest pattern within one sector is selected to be higher than a signal variation during reproduction, separation between a trial write pattern signal and the signal variation can be permitted and the detection accuracy can be increased. In a signal variation component during reading, a frequency component due to retardation possessed by the disc substrate per se is predominant and the period which is twice or more the main period of retardation may preferably be selected as the repetition period of the trail write pattern.

Reading operation in the trail write processing is started by positioning the optical head at a trail write track. While changing power through the above-described recording operation, a recorded sector is read selectively in an orderly manner. In the trial write pattern center level detecting circuit 19, a center level (V1) of a densest pattern and a center level (V2) of a thinnest pattern are detected from a read-out signal of each sector and a voltage difference ΔV=V1−V2 is determined. The ΔV is converted by the A/D converter 20 into digital signal and taken into the controller 8. A recording condition for the sector in which ΔV=0, that is, the decision condition for the optimum recording power is satisfied is found out of the digital data. If, in this series of processings, there is no sector in which ΔV=0 is satisfied, the magnitude of the recording condition is decided on the basis of positive or negative of the polarity of ΔV, and recording start power is again set in accordance with a decision result and the trial write processing is executed. If no sector in which ΔV=0 is satisfied is found even after the trial write processing has been executed twice or more for the same track, the apparatus is determined to be abnormal and the processing ends. After a sector in which ΔV=0 is satisfied has been found, power set for this sector is defined as optimum power, which is stored in a memory included in the controller. The trial write track for which the optimum power is determined through trial write in this manner is erased in preparation for the next trail write processing. Erase power used in that case is set to the maximum recording power used in this trial write processing, thereby ensuring an erase operation without erase residual. After completion of the trail write processing at the inner periphery, a trail write processing at the intermediate periphery is executed. Similarly, after a sector in which ΔV=0 is satisfied has been found at the intermediate periphery, setting power for this sector is defined as optimum power, which is stored in the memory of the controller. Finally, a similar trial write processing is also executed at the outer periphery and after a sector in which ΔV=0 is satisfied has been found, setting power for this sector is defined as optimum power, which is stored in the memory of the controller. Optimum power for each zone is calculated from the optimum power at the inner, intermediate and outer peripheries through interpolation and stored in the memory and the trail write processing ends. Then, recording and reproduction of regular information starts. In the trial write track erase operation upon start of trail write in the above-described embodiment, an unrecorded sector detecting operation may be executed in place of the erase operation, whereby recording operation is executed on a detected unrecorded sector by changing recording power level sequentially. However, recording on the sector is carried out at least every other sector. While in the above embodiment the trial write processing is executed at the inner, intermediate and outer peripheries, only a trial write processing may be executed at a certain single zone in the disc to obtain similar effects when recording sensitivity to a recording medium is known in advance. In that case, the above trial write processing at the inner, intermediate and outer peripheries may be executed, as necessary.

Figure 22:
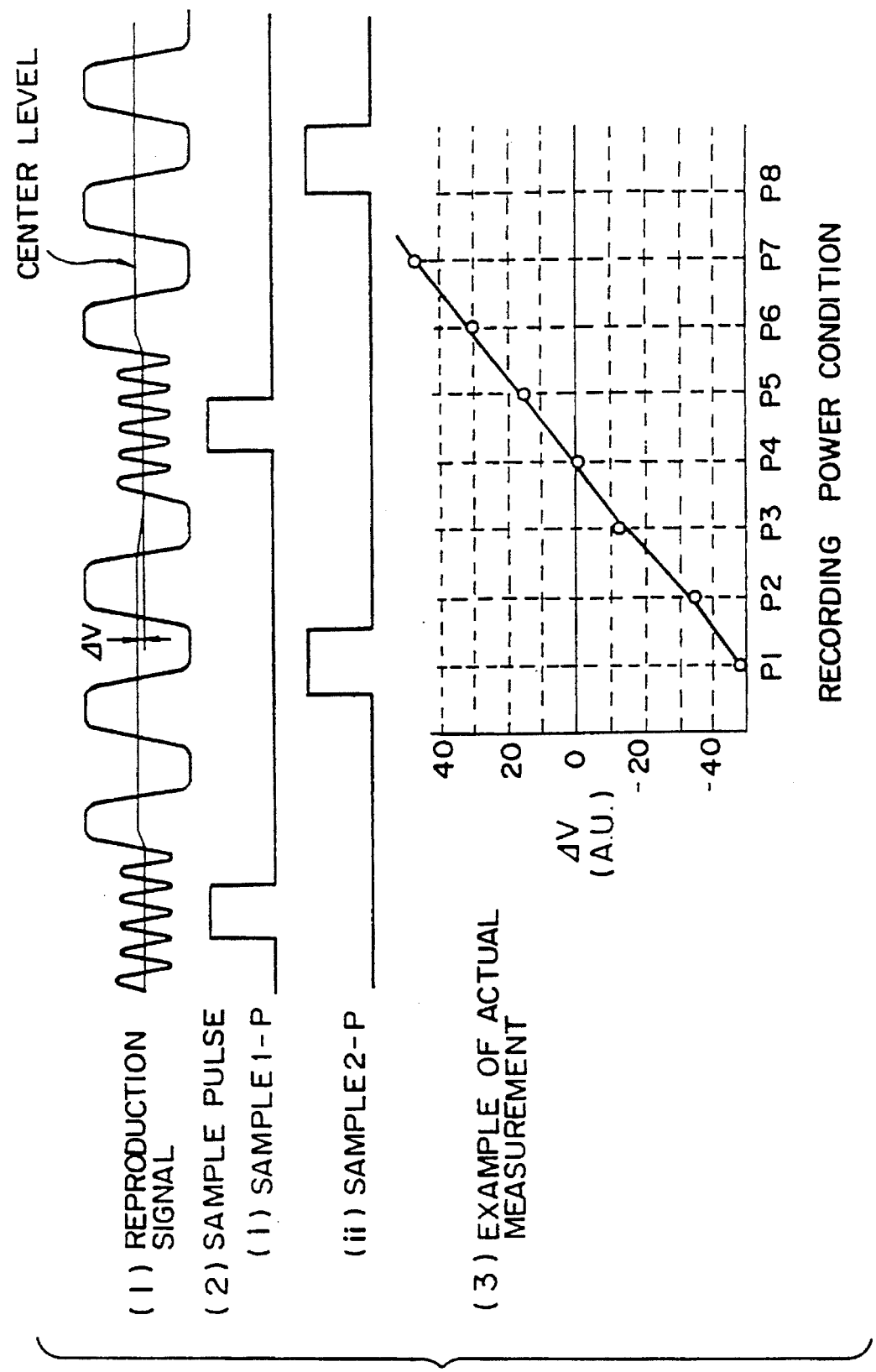
FIG. 22 is a diagram showing a reproduction signal obtained in the trial write processing and an example of actual measurement.

FIG. 22 shows a reproduction signal obtained in the trial write processing and an example of actual measurement. In the reproduction signal, the difference ΔV between the center levels of a densest pattern and a thinnest pattern changes in accordance with the magnitude of recording power. In synchronism with the periods of the densest pattern and thinnest pattern, two kinds of sampling pulses SAMPLE1-P and SAMPLE2-P are issued from the controller 8 and center levels V1 and V2 are detected from the respective patterns. Illustrated at section (3) in FIG. 22 is an example of ΔV=V1−V2 relative to recording power conditions which is obtained in the trail write processing. In the absence of a recording condition for ΔV=0, it is possible to calculate the recording condition for ΔV=0 from a negative or positive recording condition which is closest to 0 (zero).

Figure 23:
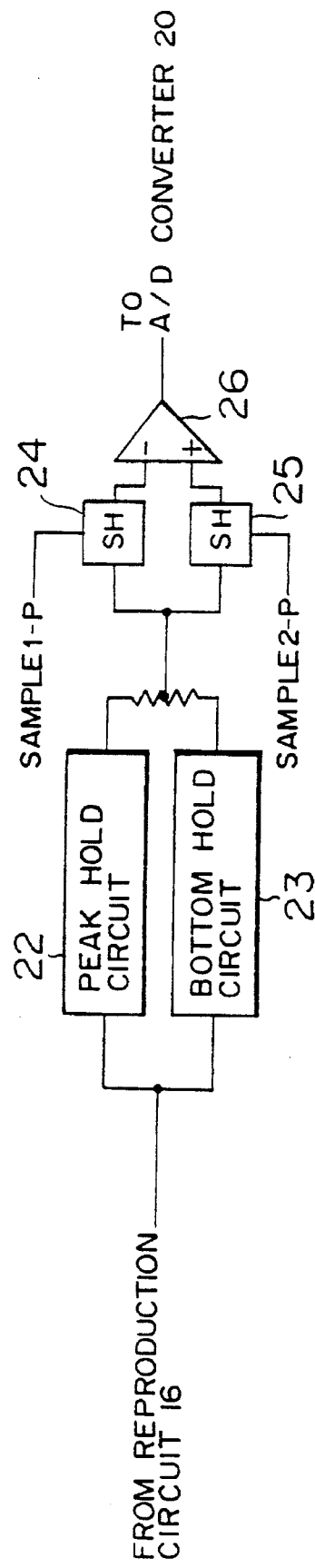
FIG. 23 is a block diagram showing a first embodiment of a trial write pattern center detecting circuit 19.

FIG. 23 shows a first embodiment of the trial write pattern center level detecting circuit 19. Here, an envelope of a reproduction signal from the reproduction circuit 16 is detected by a peak hold circuit 22 and a bottom hold circuit 23, and the envelope is divided by a resistor to detect a center level. Thereafter, center levels V1 and V2 corresponding to the respective patterns are detected by two sample hold circuits 24 and 25 and then, ΔV is determined by means of a differential amplifier 26 and inputted to the A/D converter 20. The ΔV is converted by the A/D converter into digital data which is sent to the controller 8.

Figure 24:
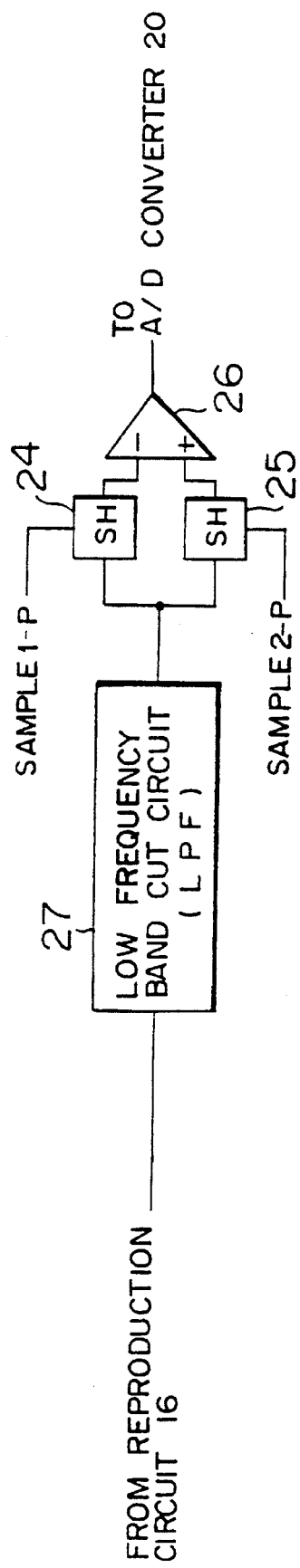
FIG. 24 is a block diagram showing a second embodiment of the trial write pattern center detecting circuit 19.

FIG. 24 shows a second embodiment of the trail write pattern center level detecting circuit 19. In the present embodiment, a low frequency band cut circuit (LPF) 27 is provided for a read-out signal from the reading circuit 16, whereby an average level of the read-out signal is detected by the circuit 27 and thereafter, like the first embodiment, average levels V1 and V2 corresponding to the respective patterns are detected by two sample hold circuits 24 and 25 and then, ΔV is determined by means of a differential amplifier 26 and inputted to the A/D converter 20.

As has been described, the present invention is generally applicable to a recording method using a memory medium sensitive to temperatures.

We claim:

1. A control method of controlling recording and reproducing of optical records in an optical magnetic disk apparatus using a mark length recording method, comprising the steps of:

recording a predetermined test pattern on a recording medium;

reproducing said predetermined test pattern;

controlling at least one shift amount selected from a defocus amount of a laser beam on a recording medium, a position shift amount of a recording position on a track at which recording is performed on said recording medium and a power shift amount of laser power irradiated during recording, to reduce a distortion of the reproduced said predetermined test pattern to less than a first predetermined value;

obtaining control information under various environments in which optical recording and reproducing are performed, by repeating said steps of recording, reproducing said predetermined test patterns and controlling;

recording general data on said recording medium by setting an optimum pulse width or an optimum laser power for recording on a basis of said control information; and reproducing said general data by subjecting a reproduced said general data to wave-equalizing processing, to reduce a distortion of said general data reproduced to less than a second predetermined value which is less than said first predetermined value.

2. A control method according to claim 1 wherein, in said controlling step, a characteristic to be controlled when recording and reading of said predetermined test pattern are performed is said defocus amount of a laser beam on said recording medium during recording of said test pattern, and said defocus amount is adjusted to ±0.05 μm or less.

3. A control method according to claim 1 wherein, in said controlling step, a characteristic to be controlled when recording and reading of said predetermined test pattern are performed is said position shift amount of a recording position on a track at which recording is done on said recording medium, and said position shift amount is adjusted to ±0.10 μm or less.

4. A control method according to claim 1 wherein, in said controlling step, a characteristic to be controlled when recording and reading of said predetermined test pattern are performed is said power shift amount of laser power irradiated on said recording medium during recording, and said power shift amount is adjusted to ±0.20 mW or less.

5. A control method according to claim 1 wherein a system for providing information to an edge portion of an information recording pit is used as a system for recording said general data on said recording medium.

6. A control method according to claim 1 wherein for determination of said control information, a predetermined recording pattern is trially recorded in advance of recording, the recorded said predetermined recording pattern is reproduced, and a reproduced said predetermined recording pattern is compared with reference information stored in a predetermined table to determine said control information.

7. A control method according to claim 1 wherein a medium including a magnetic film having vertical magnetic anisotropy is used as said recording medium to perform recording in a direction of magnetization of said vertically magnetized film, and recorded information is reproduced by using a magneto-optical effect to thereby perform recording and reading, a shape of a magnetic domain to be formed in said recording medium being controlled to control a read-out signal waveform.

8. A control method according to claim 2, wherein said defocus amount is more specifically adjusted to ±0.30 μm or less.

9. A control method according to claim 3, wherein said position shift amount is more specifically adjusted to ±0.80 μm or less.

10. A control method according to claim 4, wherein said power shift amount is more specifically adjusted to ±0.10 mW or less.

* * * * *